(No Model.)
E. W. RIDER.
CARRIAGE POLE TIP.
No. 488,133. Patented Dec. 13, 1892.
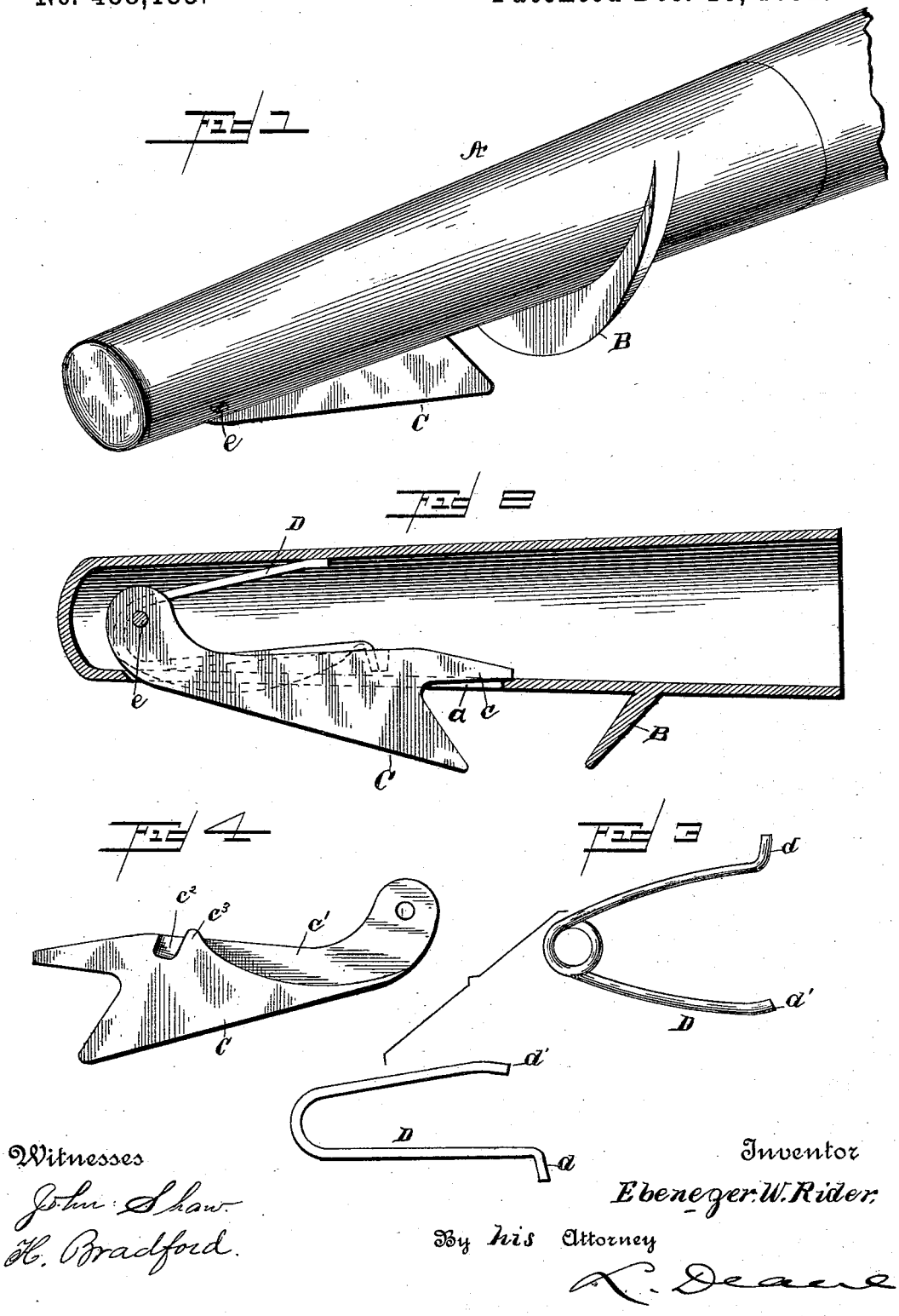
Witnesses
John Shaw
H. Bradford
Inventor
Ebenezer W. Rider
By his Attorney
R. Deane

UNITED STATES PATENT OFFICE.

EBENEZER W. RIDER, OF RACINE, WISCONSIN.

CARRIAGE-POLE TIP.

SPECIFICATION forming part of Letters Patent No. 488,133, dated December 13, 1892.

Application filed July 13, 1891. Renewed May 31, 1892. Serial No. 434,975. (No model.)

*To all whom it may concern:*

Be it known that I, EBENEZER W. RIDER, a citizen of the United States, residing at Racine, in the county of Racine and State of Wisconsin, have invented certain new and useful Improvements in Carriage-Pole Tips; and I do hereby declare the following to be a full, clear, and exact description of the invention, such as will enable others skilled in the art to which it appertains to make and use the same.

Figure 1 is a perspective view of a vehicle-pole tip having this invention. Fig. 2 is a central longitudinal section of Fig. 1, but showing the catch in elevation; Fig. 3, side views of the spring, showing different forms of same. Fig. 4 is a side view of the dog, enlarged.

This invention is designed to prevent the neck-yoke from slipping off or getting out of place from accident or otherwise; and the novelty consists in the construction and combination of parts of the device by means of which this end is attained, all as will now be more fully set out and explained, as well as pointed out in the claims, reference being had to the accompanying drawings. Heretofore several different devices of this kind have been made and used in which a spring-actuated catch or dog has been so placed within the hollow tip as to project downward, so as to furnish the means for the engagement and retention of the yoke; but the difficulty in some of the best ones has been to so construct and adapt the parts of which the device was made that a moderate-sized spring would be effectual to keep the catch or dog down as well as prevent the rattling of the parts. Beside all this, in none of this kind of devices that I know about can the several parts be easily and quickly put together.

In my device the dog or catch is so made and the spring so combined with it that in a considerable degree the downward pressure is leverage. Thus with a small-sized and easily-placed spring the dog will be kept normally extending downward and in engagement on the yoke, and at the same time the action of the spring will tend to reduce to a minimum the rattling of the parts—in fact, entirely prevent it.

In the accompanying drawings, A denotes any ordinary tip for a carriage-pole. It is hollow and has externally a downwardly-projecting lug B near the end where it fits upon the pole. The catch or dog C is pivoted in the front end of this tip by the pin $e$, passing through the tip, so that said catch or dog has movement in the slot $a$. At the end of the dog opposite to the pivoted point is the lip $c$, which is adapted in the normal position of the dog to rest upon the inside of the tip. In the edge of the dog and at one side and from top nearly to bottom and from front end beyond the middle is a depression $c'$ of sufficient depth to lay the spring D into. Beyond this the dog has also another small depression $c^2$, thus forming between the depressions and upon the outer edge of the dog a little teat $c^3$. The spring is of wire and usually constructed as shown in Fig. 3, and, passing about or around the pivot-pin of the dog, is held in place by the depressions in the dog and by the engagement of its respective free ends upon the inside of the tip and upon the dog. In this position the hooked end $b$ of the spring passes behind and over the teat $c^2$ and rests in the depression $c'$, so that it has always a firm position, while its opposite end $d'$, pressing against the inside of the tip, insures the requisite pressure to keep the dog down. By this construction of the several parts there is no difficulty in putting them together, and once in place they are securely fixed for action. The peculiar position of the spring insures most perfect results. It is preferably of brass and of any convenient size.

This invention is also admirably adapted for the ends of whiffletrees to hold the tugs in place.

Having now described my invention, I claim—

1. The within-described carriage-pole tip, having a downwardly-extending external lug B and slotted at $a$, combined with dog C, which is constructed with depressions $c'$ $c^2$ and teat $c^3$ and pivoted to move in slot $a$ and having at one end the lip $c$ to engage on the inside of this tip, substantially as and for the purposes set forth.

2. In combination with the hollow pole-tip A, slotted at $a$, the pivoted dog C, having in its side depressions to hold the spring, and the spring passing round the pivot-pin of the dog, its free ends pressing, respectively, against the inside of the tip and the dog, substantially as described.

3. In combination with the hollow pole-tip, the dog C, pivoted within and combined with the spring D, which passes around the pivot of the dog and at one end rests against the inside of the tip and at the other against the dog, substantially as shown and described.

In testimony whereof I affix my signature in presence of two witnesses.

EBENEZER W. RIDER.

Witnesses:
 ERASTUS C. PECK,
 ALBERT L. ANDERSON.